Feb. 14, 1956 T. A. EARLEY, JR., ET AL 2,734,279
GYROSCOPIC INSTRUMENTS
Filed Aug. 2, 1952 2 Sheets-Sheet 1

INVENTORS
THOMAS A. EARLY, JR.
ERNEST A. FITTER
BY
Arthur H. Serrell
ATTORNEY

Feb. 14, 1956 T. A. EARLEY, JR., ET AL 2,734,279
GYROSCOPIC INSTRUMENTS
Filed Aug. 2, 1952 2 Sheets-Sheet 2

INVENTORS
THOMAS A. EARLY, JR.
ERNEST A. FITTER
BY
Arthur H. Serrell
ATTORNEY

# United States Patent Office 2,734,279
Patented Feb. 14, 1956

2,734,279

GYROSCOPIC INSTRUMENTS

Thomas A. Early, Jr., Sea Cliff, and Ernest A. Fitter, Glen Head, N. Y., assignors to Sperry Rand Corporation, a corporation of Delaware Application August 2, 1952, Serial No. 302,376

3 Claims. (Cl. 33—204)

This invention relates to gyroscopic instruments of the direct reading type in which the information provided thereby is presented at a window in the housing of the instrument. For illustrative purposes, the instrument embodying the present inventive concepts is shown as an attitude gyroscope or gyroscopic horizon as employed on aircraft to present pitch and roll information to the pilot showing the craft's attitude with respect to a reference position about its respective athwartship and fore and aft axes. It will be understood, however, that our invention is applicable to any type of gyroscopic instrument which is subject to alignment or to approximate alignment of the support axis of the gimbal ring and the axis of the gyroscopic rotor of the apparatus when the instrument is rendered nonoperative. Such a condition, known as gimbal lock, is obtained in electric instruments of this type when the power is turned off, due to the fact that a torque is produced by the decelerating gyroscopic rotor, one of whose components is effective about the axis of the gimbal ring, thus causing the rotor case to precess so that the spin axis of the rotor may move into alignment or into approximate alignment with the gimbal support axis.

One of the features of the present invention is to provide a novel instrumentality for preventing the rotor case and gimbal ring from rapidly rotating about the axis of the ring upon the occurrence of the noted condition, the operation of which is dependent upon a means for rendering the gyroscopic instrument nonoperative.

Another feature of the invention resides in the combination of the above instrumentality with a means for operating an "off" indicating flag visible at the window of the instrument.

Other features and advantages of our invention will become apparent from the following detailed description of the preferred embodiment thereof shown in the accompanying drawings in which, Fig. 1 is a side elevational view partly in section showing a gyroscopic instrument embodying the present inventive concepts;

Figure 1:
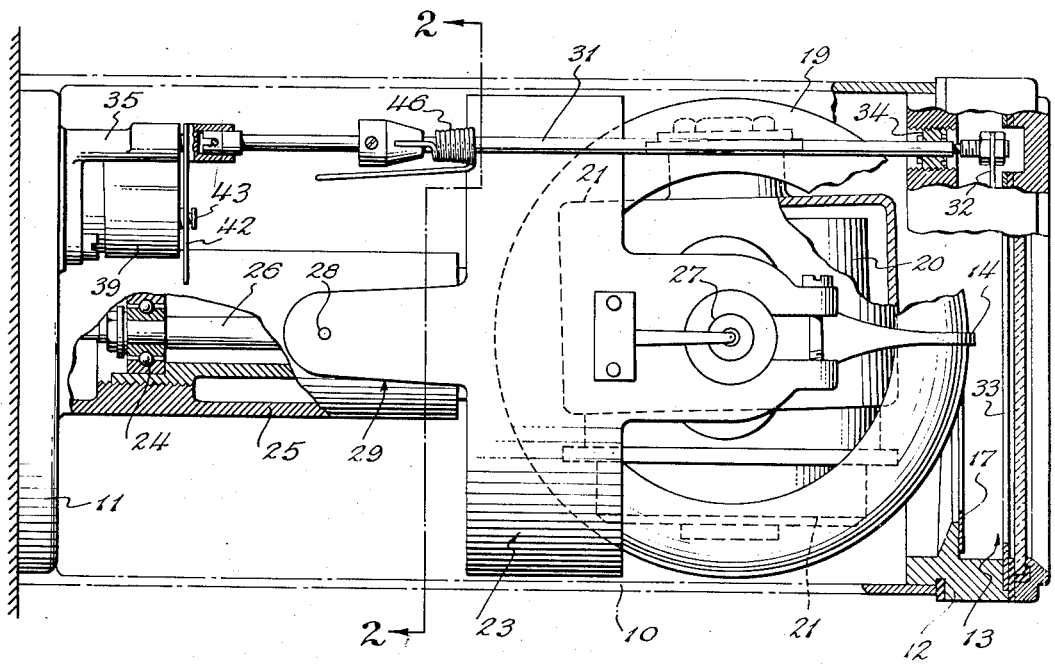
Figure 3:
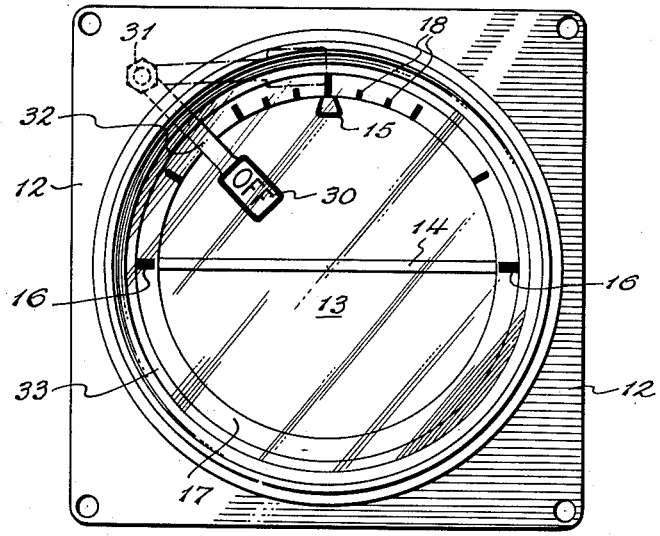
Fig. 3 is a front elevational view of the instrument shown in Fig. 1.

Figs. 1 and 3 of the drawings show a gyroscopic instrument of the character known as an attitude gyroscope or gyroscopic artificial horizon. These instruments are of the direct reading type and are suitably mounted on the instrument panel of an aircraft to provide the pilot of the craft with visual information concerning the pitch and bank attitude of the craft with respect to a reference as established by the instrument. In instruments of this character, the mounting housing thereof is provided with a window in its rear wall at which the information of the instrument is presented. The housing 10 shown in Fig. 1 includes a front wall 11 and rear wall 12, Fig. 3, which is provided with suitable corner openings therein facilitating its connection to the instrument panel of an aircraft. The rear wall 12 includes a window 13 at which the pilot views an horizon bar 14 and a roll index 15. The pitch attitude of the craft may be observed by comparing the bar 14 with an adjustable index as shown in U. S. Letters Patent No. 2,485,552, issued October 25, 1949 to E. F. Aumuller or with reference to the pitch indices 16 situated on the periphery of a circular opening in a plate 17 secured by suitable screw fastenings to an inside flange in the wall 12 to the back of the window 13. The actuating mechanism for bar 14 may be of the character shown in the noted patent. The roll index 15 is compared to a scale represented at 18 which is situated on the upper portion of the fixed plate 17 about the periphery of the circular opening therein. As shown, roll index 15 may be formed as a portion of a spherical background element 19 or an extension thereof in accodance with the showing in the Aumuller patent.

Figure 5:
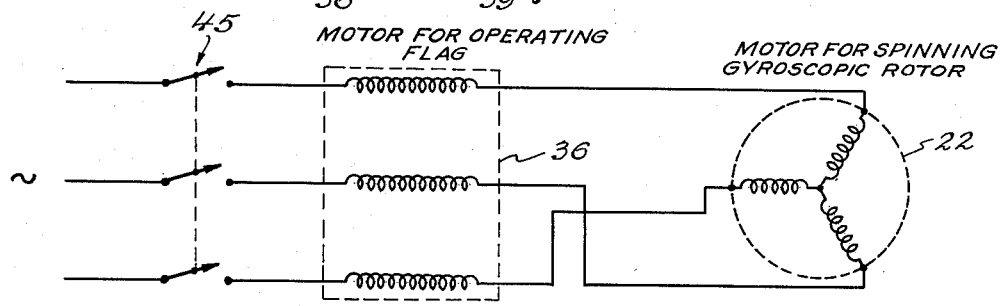
Fig. 5 is a wiring diagram showing the circuitry used in the improved instrument.

The gyroscopic elements of the instrument include a gyroscopic rotor 20 mounted in a case 21 to spin about a substantially vertical axis. The rotor is spun by suitable means such as an electric motor whose stator 22 is indicated in Fig. 5. A gimbal ring 23 universally supports the rotor 20 and case 21 in the housing 10 in a conventional manner. As shown, the ring 23 is mounted with freedom relative to the housing 10 by means of suitably spaced bearings, one of which is indicated at 24, situated in a bearing housing 25 extending rearwardly of the front wall 11. The instrument is mounted in the craft so that the support axis of the ring lies in the same plane as the fore and aft axis of the craft and is approximately horizontal when the wings of the craft are level. The forwardly extending shaft 26 is formed as a portion of the gimbal ring 23. The athwartship or pitch axis connection between the case 21 and ring 23 may be of a conventional nature, the same including a pair of spaced bearings mounted on the ring, one of which is designated at 27 in Fig. 1. Case 21 consequently has freedom relative to the housing 10 about an axis that normally corresponds to the athwartship or pitch axis of the craft and is normally horizontal. The rotor 20 in case 21 is universally supported with freedom about mutually perpendicular, normally horizontal axes, relative to the housing 10 of the instrument. The background spherical part 19 positioning the roll index 15 is suitably fixed to the rotor case 21.

In accordance with the present invention, the ring 23 includes a normally ineffective part shown in the form of a pin 28 that is engageable to resist motion of the ring about its support axis. As shown, pin 28 is fixedly mounted on a forwardly extending portion 29 of the ring 23. The improved instrument may further include an off indicating flag 30 that is visible as shown in Fig. 3 when the instrument is in nonoperating condition. In accordance with the invention, means are provided for operating the flag 30 dependent upon the operation of the gyroscopic rotor spinning means, such means including a shaft 31 having limited angular motion relative to the housing 10. Flag 30 is connected to one end of the shaft 31 by means of an arm 32. As shown, the flag 30 and arm 32 are situated between plate 17 and a fixed masking plate 33 for the flag suitably connected to wall 12 to the back of the window 13. In its concealed position, the flag is located behind the masking plate 33 is clearly indicated by the dash lines in Fig. 3. As particularly shown in Figs. 1 and 4, shaft 31 extends lengthwise of the instrument within the housing 10 being supported at one end by a threaded bearing member 34 that is turned into position in a portion of the rear wall 12 of the instrument so as to engage a pin fixed to the shaft 31 to prevent axial motion of the shaft. The opposite end of the shaft 31 is joined to a stub shaft 31' by a pin and and slot connection. The stub shaft 31' projects into the housing 35 of the stator part of an electric motor 36, Fig. 4, that is suitably secured to the inside of the front wall 11 of the instrument. A bearing 37 is also provided in housing 35 for the projecting end of the stub shaft 31'.

Figure 2:
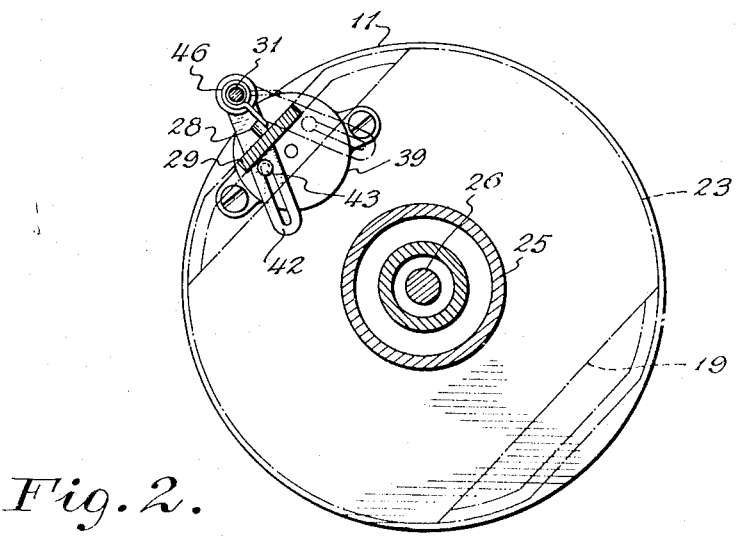
Fig. 2 is a section view taken on line 2—2, Fig. 1, with the gimbal ring displaced showing the parts of the instrument that engage to resist motion of the ring about its axis in an engaged condition.
Figure 4:
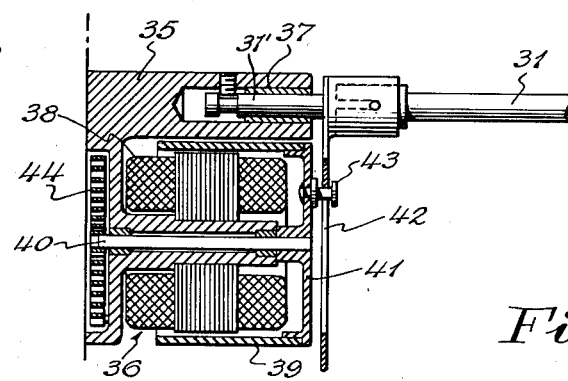
Fig. 4 is an enlarged vertical section of the motor element per se of the flag operating means employed in the improved instrument.

The motor for operating the flag 30 shown in Fig. 4 is an alternating current stall type induction motor whose three phase wound stator 38 is fixedly mounted in the housing 35. The cylindrical armature 39 of the motor 36 is mounted on a shaft 40 journaled within the housing 35 by a connecting plate 41. The angular motion of the shaft 31 which in turn rotates the flag 30 relative to instrument housing 10 is limited by an interconnection between motor 36 and shaft 31 in the form of a pin and slot connection as particularly shown in Figs. 2 and 4. Such connection is provided, in the instant case, by a slotted arm 42 extending radially of stub shaft 31'. As shown, the arm is formed as a projection from the stub shaft 31'. The pin 43 of the connection is fixedly secured to the plate 41 of the armature part of motor 36. The location of the pin and size of the slot in the arm 42 are such that the motion that motor 36 can impart to the shaft is limited as desired. The respective limit determining positions of the arm 43 are shown in Fig. 2. A spring 44, Fig. 4, having one end connected to housing 35 and the other end connected to shaft 40 is effective to maintain the flag 30 in its "off" position as represented in full lines in Fig. 3 when the instrument is nonoperative. In this position, the pin 43 and arm 42 are located in the full line representation thereof in Fig. 2.

The improved instrument also includes a means for rendering the gyroscopic rotor spinning means nonoperative. Such a means is shown in Fig. 5 in the form of an off-on switch 45 which connects the windings of the rotor spinning motor with a suitable source of alternating current electrical energy. As shown in this figure, flag operating motor 36 is included in the energizing circuit in series relation with the rotor spinning motor. With the switch 45 opened and both of the motors unenergized, the spring 44 is effective to move the shaft 31 so that the flag 30 appears as shown in the full line position in Fig. 3. When the switch 45 is closed so as to render the instrument operative, both motors are energized, one functioning to spin the gyroscopic rotor and the other to move the flag 30 to its concealed position behind masking plate 33 against the influence of spring 44 where it remains until the switch 45 is opened.

The element provided to cooperate with the gimbal pin 28 to resist motion about the axis of the gimbal ring when the instrument is nonoperative is shown in the form of a spring 46, Fig. 1, one end of which is fixed to shaft 31 by a suitable fastening collar. The opposite end of the spring 46 is left free to yieldingly engage the pin 28 on the gimbal ring 23. When the instrument is in operation and flag 30 is hidden, the shaft 31 positions the spring 46 as represented in dash lines in Fig. 2 so that there is clearance for the pin 28 below the spring and there is no restriction of the freedom of gimbal ring 23 at such time. However, when the instrument is nonoperative or when flag 30 is visible at the window of the instrument for any reason, the shaft 31 has then rotated the free end of spring 41 so that it will lie in the patth of movement of the pin 28 as shown in the full line representation of the parts in Fig. 2 so that the pin will resiliently engage the free end of the spring, thereby preventing rapid rotation of the gimbal 23. It will be noted that when the spring 46 has been rotated to a position of engagement with the pin 28, any reaction force imparted to the spring by the pin 28 cannot rotate the armature 39 of motor 36 since such a reaction force is applied substantially radially of the armature 39. In any event, there is an insufficient component of the reaction force in a direction which will produce rotation of the armature 39 by the gimbal 23.

When the pin 28 engages the free end of spring 46, the latter will exert a torque on the rotor 20 in such a direction that the gimbal will be precessed away from a gimbal lock position, i. e., the gimbal support axis and rotor spin axis will not remain in aligned or substantially aligned position. Furthermore, the free end of spring 46 is so positioned that if the pin engages the latter at a high velocity, the pin will deflect the spring and pass beyond it, but as it is deflected, the spring will produce a torque as above described which will greatly reduce the velocity of the next engagement of pin and spring. Thus, the spring 46 does not act as a rigid stop but as a resilient restraining means for opposing rapid rotation of the gimbal when it nears a gimbal lock condition upon deenergization of the instrument. Such as construction eliminates shock loads on the instrument bearings and hence greatly increases the service life of the instrument.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A gyroscopic instrument having a housing, a rotor, a rotor case, a gimbal ring therefor pivotally supported in said housing for full angular freedom about its support axis, and a motor for spinning said rotor, apparatus for opposing rotation of said gimbal about said support axis when said rotor spinning motor is deenergized comprising a pin on said gimbal extending radially outwardly from said axis, a rotatable shaft mounted in said housing substantially parallel to said gimbal axis and radially displaced therefrom to an extent such that said pin clears said shaft upon rotation of the gimbal about its support axis, a spring having one end thereof fixed to said shaft and the other end thereof free, the one end of said spring being so positioned on said shaft that upon rotation of said shaft to one limited position the free end of said spring clears said pin and upon rotation of said shaft to another limited position the free end of said spring will lie in the path of movement of said pin whereby the free end of said spring will resiliently oppose rotation of said gimbal ring about said support axis, and means responsive to the energization of said rotor spinning motor and coupled with said shaft for rotating said shaft from one of said limited positions to the other.

2. A gyroscopic instrument of the character set forth in claim 1 wherein said rotor spinning motor is a polyphase motor and wherein said last-mentioned means comprises a polyphase torque motor having its stator windings connected in series circuit with the polyphase windings of said rotor spinning motor, a cylindrical rotor closed at one end thereof and pivotally mounted for rotation about said stator windings, a pin on said closed rotor end eccentrically located relative to the rotor pivot, and a slotted member interconnecting said pin and said shaft whereby rotation of said torque motor upon energization of said rotor spinning motor will rotate said shaft, the length of the slot in said member being such as to limit the travel of said pin therein whereby to limit rotation of said shaft between said positions.

3. A gyroscopic instrument of the direct reading type having a housing with a window at which the information of the instrument is presented, a rotor, a rotor case, and a gimbal ring pivotally mounted in said housing for full angular freedom about its support axis, a pin having one end thereof fixed to an arm of said gimbal ring and the other end thereof projecting outwardly from said gimbal ring in a direction substantially radially of said axis and engageable to oppose motion of said gimbal about said support axis, an "off" indicating flag, a rotatable shaft mounted in said housing substantially parallel to said axis and radially displaced therefrom to such an extent as to clear the path of rotation of said pin, said flag being mounted on said shaft and rotated thereby from a concealed position to a visible position when said instrument is rendered non-operative, means responsive to the operative condition of said instrument for so rotating said shaft, and a spring having one end thereof fixed to said shaft and the other end thereof free, the one end of said spring being fixed on said shaft such that the free end thereof clears said pin when said flag is in its concealed position but will be rotated into the path of movement of said pin when the flag is at its visible position whereby the free end of said spring will resiliently oppose rotation of said gimbal ring about its support axis when the instrument is rendered non-operative.

References Cited in the file of this patent

UNITED STATES PATENTS

| | | |
|---|---|---|
| 2,005,379 | Marcus | June 18, 1935 |
| 2,180,221 | Carter | Nov. 14, 1939 |
| 2,283,720 | Brandt | May 19, 1942 |
| 2,368,221 | Holt | Jan. 30, 1945 |
| 2,524,553 | Wendt | Oct. 3, 1950 |